United States Patent
Quintas Glasner de Medeiros et al.

(10) Patent No.: US 10,459,210 B2
(45) Date of Patent: Oct. 29, 2019

(54) OPTICAL ARRANGEMENT AND METHOD FOR IMAGING A SAMPLE

(71) Applicant: European Molecular Biology Laboratory, Heidelberg (DE)

(72) Inventors: Gustavo Quintas Glasner de Medeiros, Heidelberg (DE); Lars Hufnagel, Heidelberg (DE); Nils Norlin, Heidelberg (DE)

(73) Assignee: EUROPEAN MOLECULAR BIOLOGY LABORATORY, Heidelberg (DE)

( * ) Notice: Subject to any disclaimer, the term of this patent is extended or adjusted under 35 U.S.C. 154(b) by 23 days.

(21) Appl. No.: 15/302,569

(22) PCT Filed: Apr. 8, 2015

(86) PCT No.: PCT/EP2015/057576
§ 371 (c)(1),
(2) Date: Oct. 7, 2016

(87) PCT Pub. No.: WO2015/155212
PCT Pub. Date: Oct. 15, 2015

(65) Prior Publication Data
US 2017/0023784 A1    Jan. 26, 2017

(30) Foreign Application Priority Data
Apr. 8, 2014  (EP) .................................. 14163919

(51) Int. Cl.
*G02B 21/18* (2006.01)
*G02B 21/36* (2006.01)
(Continued)

(52) U.S. Cl.
CPC ............. *G02B 21/18* (2013.01); *G02B 21/06* (2013.01); *G02B 21/16* (2013.01); *G02B 21/361* (2013.01);
(Continued)

(58) Field of Classification Search
CPC ........ G02B 21/18; G02B 21/06; G02B 21/16; G02B 21/367; G02B 21/361;
(Continued)

(56) References Cited

U.S. PATENT DOCUMENTS

| | | |
|---|---|---|
| 4,440,475 A | 4/1984 | Colliaux |
| 5,132,837 A | 7/1992 | Kitajima |

(Continued)

FOREIGN PATENT DOCUMENTS

| | | |
|---|---|---|
| WO | 2008028045 A2 | 3/2008 |
| WO | 2011120629 A1 | 10/2011 |

OTHER PUBLICATIONS

Huisken, J., et al., "Optical Sectioning Deep Inside Live Embryos by Selective Plane Illumination Microscopy", "Science", Aug. 13, 2004, pp. 1007-1009, vol. 305.
(Continued)

*Primary Examiner* — Jared Walker
(74) *Attorney, Agent, or Firm* — Hultquist, PLLC; Steven J. Hultquist

(57) ABSTRACT

An optical arrangement for imaging a sample is disclosed. The optical arrangement comprises at least one first objective lens and at least one second objective lens, at least one illumination source for producing an illumination beam, detector for imaging radiation from the sample, and at least one mirror for reflecting the radiation from one of the first objective lens or the second objective lens into the detector. The at least one mirror is double-sided and dependent on the illumination beam at the other one of the first objective lens and the second objective lens.

13 Claims, 8 Drawing Sheets

(51) Int. Cl.
*G02B 21/06* (2006.01)
*G02B 21/16* (2006.01)
*H04N 13/106* (2018.01)
*H04N 13/207* (2018.01)
*H04N 13/282* (2018.01)

(52) U.S. Cl.
CPC ......... *G02B 21/367* (2013.01); *H04N 13/106* (2018.05); *H04N 13/207* (2018.05); *H04N 13/282* (2018.05); *H04N 2213/001* (2013.01)

(58) Field of Classification Search
CPC ......... H04N 2213/001; H04N 13/0207; H04N 13/0282; H04N 13/0007
See application file for complete search history.

(56) References Cited

U.S. PATENT DOCUMENTS

| | | |
|---|---|---|
| 2002/0082476 A1 | 6/2002 | Takahashi et al. |
| 2008/0259345 A1* | 10/2008 | Fukutake ............... G02B 21/18 356/450 |
| 2011/0115895 A1* | 5/2011 | Huisken ............. G02B 21/0048 348/79 |
| 2012/0002031 A1* | 1/2012 | Pertsinidis ............. G02B 21/16 348/79 |
| 2012/0044486 A1 | 2/2012 | Chen et al. |
| 2012/0049087 A1* | 3/2012 | Choi ................... G01N 21/4795 250/459.1 |
| 2012/0206798 A1* | 8/2012 | Knop ................... G02B 21/002 359/385 |
| 2013/0335818 A1* | 12/2013 | Knebel ............. G01N 21/6458 359/385 |

OTHER PUBLICATIONS

Krzic, U., et al., "Multiview Light-Sheet Microscope for Rapid in toto Imaging", "Nature Methods", Jun. 3, 2012, pp. 730-736, vol. 9, No. 7.

Swoger, J., et al., "Multiple Imaging Axis Microscopy Improves Resolution for Thick-Sample Applications", "Optics Letters", Sep. 15, 2003, pp. 1654-1656, vol. 28, No. 18.

Wu, Y., et al., "Spatially Isotropic Four-Dimensional Imaging with Dual-View Plane Illumination Microscopy", "Nature Biotechnology", Oct. 13, 2013, pp. 10321038, vol. 31.

* cited by examiner

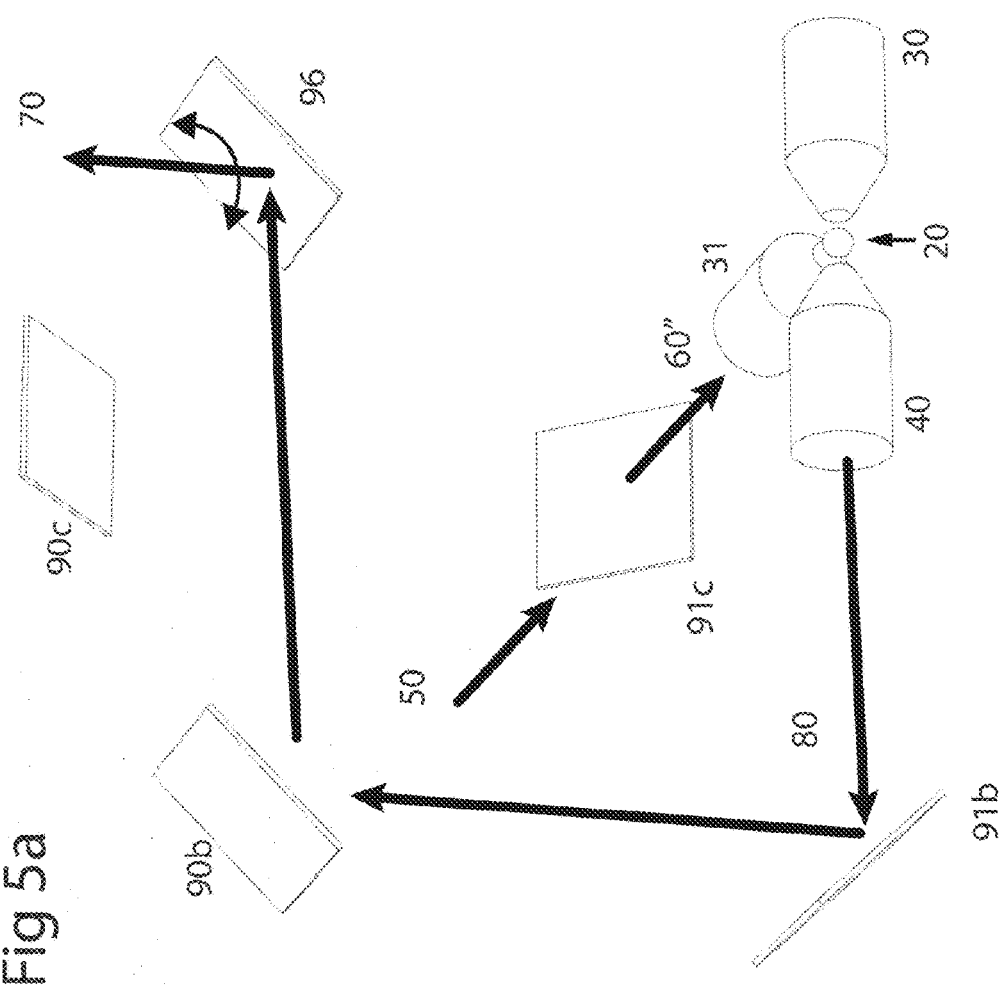

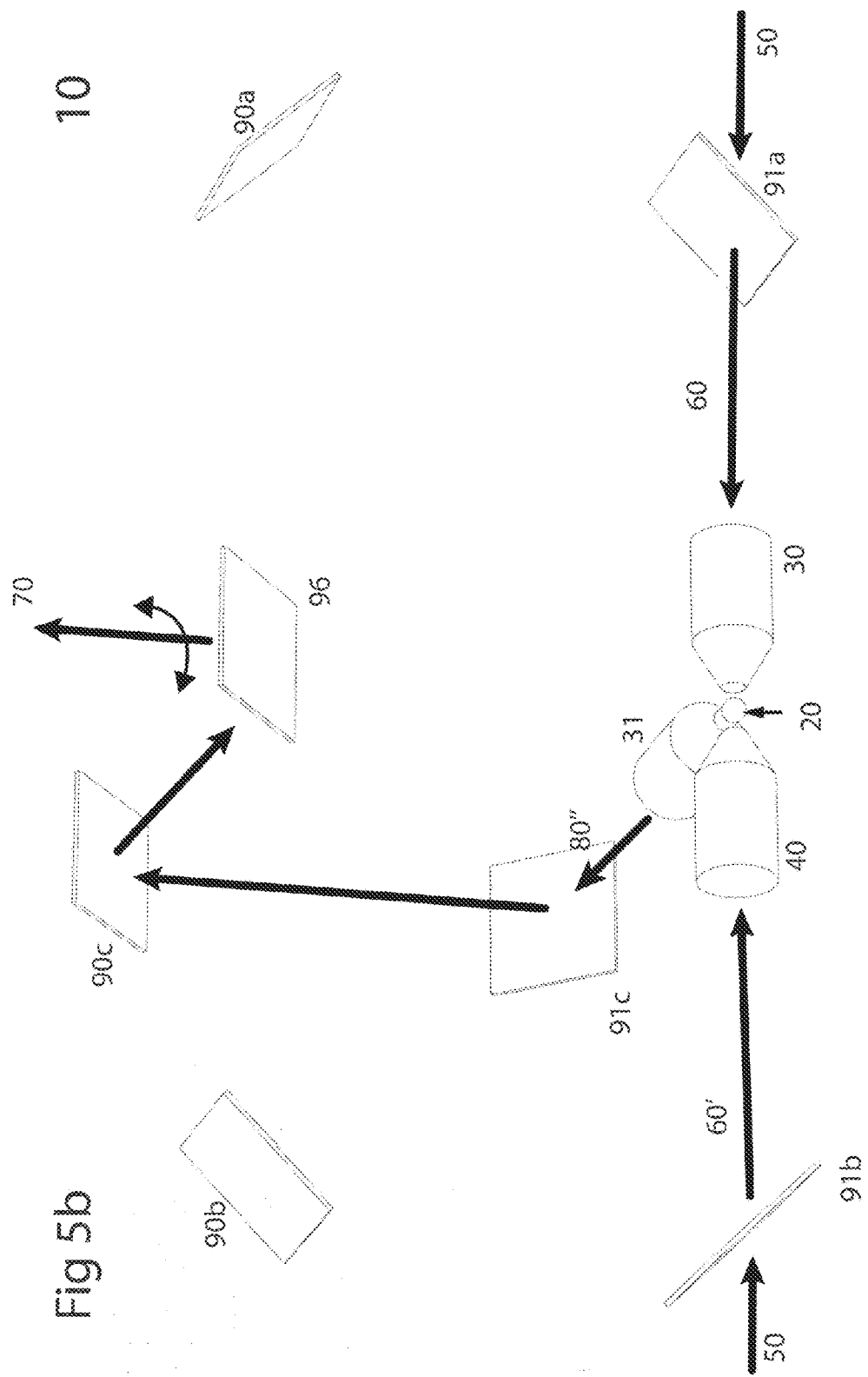

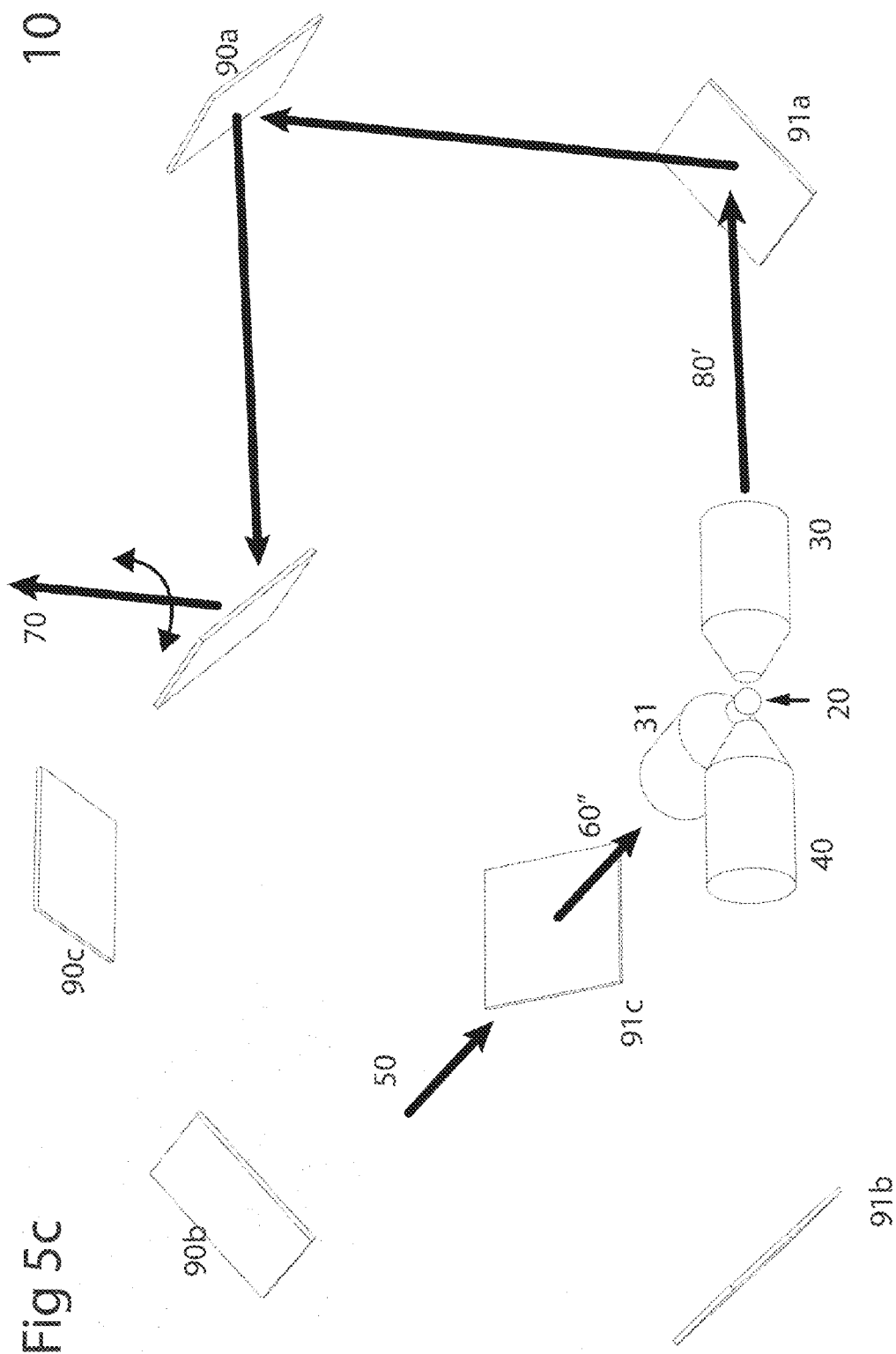

OPTICAL ARRANGEMENT AND METHOD FOR IMAGING A SAMPLE

CROSS-RELATION TO OTHER APPLICATIONS

This application is a U.S. national phase application under the provisions of 35 U.S.C. § 371 of International Patent Application No. PCT/EP15/57576 filed Apr. 8, 2015, which in turn claims priority of European Patent Application No. 14163919.5 filed Apr. 8, 2014. The disclosures of such international patent application and European priority patent application are hereby incorporated herein by reference in their respective entireties, for all purposes.

FIELD OF THE INVENTION

The invention relates to an optical arrangement and a method for imaging a sample using at least two illumination beams.

BACKGROUND TO THE INVENTION

A microscope is a scientific instrument that is used for the visualization of objects, which can be either small cells or have details that are too small to be resolved by the naked eye.

There are many types of microscopes available on the market. The most common of these and the first to be invented is the so-called optical microscope, which uses light in a system of lenses to magnify images of the samples. The image from the optical microscope can be either viewed through an eyepiece or, more commonly nowadays, captured by a light-sensitive camera sensor to generate a so-called micrograph. There are a wide range of sensors available to catch the images. Non-limiting examples are charge-coupled devices (CCD) and scientific complementary metal-oxide semiconductor (sCMOS) based technologies, which are widely used. These sensors allow the capture and storage of digital images to the computer. Typically there is a subsequent processing of these images in the computer to obtain the desired information.

The illumination sources as used in optical microscopes have been developed over the years and wide varieties of illumination sources are currently available, which can emit light or other type of radiation at different wavelengths. Optical filters can be placed between the illumination source and the sample to be imaged in order to restrict the wavelength of the radiation illuminating the sample.

Modern biological microscopy uses fluorescent probes for imaging specific structures within a cell as the sample. In contrast to normal trans-illuminated light microscopy, the sample in fluorescent microscopy is illuminated through one or more objective lenses with a narrow set of light wavelengths. These narrow set of light wavelengths interact with fluorophores in the sample, which then emit light of a different wavelength. This emitted fluorescent light is detected in a detector and is used to construct the image of the sample.

The use of multiple images enables a 3-dimensional reconstruction of the sample to be made. This 3-D reconstruction can be done by generating images at different positions on the sample, as the sample moves relatively to one or more objective lens. Depending on the number of detection units necessary, several detectors may be required. These detectors are quite expensive and a microscope designer will wish to reduce the number of detectors. The use of a single detector, which is moved during the imaging process, can be disadvantageous in that the movement of the detector itself can slightly effect the position of the sample, due to vibrations. Alternately the sample itself may move for other reasons whilst the detector is being placed into another position. This movement of the detector requires a precise and fast movement of a part of hardware, which is comparatively massive and in turn leads to further increase in development costs and/or in extra parts of equipment.

A number of papers and patents have been published on various aspects of microscopy. For example, European patent EP 1 019 769 (Carl Zeiss, Jena) teaches a compact confocal feature microscope, which can be used as a microscope with a single objective lens or with multiple objective lenses. The microscope has separate directions of illumination and detection. The direction of detection in the objective lens is aligned inclined at a set angle in relation to the direction of illumination.

Another example of a microscope is taught in the paper by Krzic al. "Multi View Light-Sheet Microscope for Rapid in tow Imaging", Nature Methods, July 2012, vol. 9 No. 7, pages 730-733. This paper teaches a multi-view selective-plane illumination microscope comprising two detection and illumination objective lenses. The microscope allows in tow fluorescence imaging of the samples with subcellular solution. The fixed geometrical arrangement of the imaging branches enables multi-view data fusion in real time.

Document DE 195 09 885 A1 discloses a stereo endoscope wherein illuminating light is transmitted by the light guide inserted through the elongate inserted section and is projected out of the distal end surface of the inserted section. The illuminated objects pass through the respective pupils of the two objective lens systems arranged in parallel within the distal end section of the inserted section and their images are formed on the focal surface. The respective images are transmitted to the rear side by one common relay lens system. The transmitted final images are formed respectively on the image taking surfaces of the image taking devices. The respective images are photoelectrically converted by the respective image taking devices and further processed to be signals, are displayed in the monitor and are stereo-inspected through shutter spectacles.

Document U.S. Pat. No. 4,440,475 A discloses a device having a electromagnetic lens for focusing the analyzing electron beam that is provided with a central channel along the axis of the electron beam which is intended to pass through a mirror-objective having high magnification. The electromagnetic lens further comprises a lateral channel in which it is placed an auxiliary objective having low magnification. An optical illumination system, the axis of which is contained in the plane of the axes of the objectives, illuminates the sample either through the principal objective or through the auxiliary objective. An orientable mirror which is orthogonal to the plane aforesaid and placed at the intersection of the beams which form the images through the two objectives permits the use of the same observation means both for low magnification and for high magnification.

In document U.S. Pat. No. 5,132,837 A is an operation microscope disclosed including a plurality of objective lenses arranged at different angles with respect to an object to be viewed and a selecting optical system having a function of selecting one of light beams from the objective lenses and enabling the object to be observed at the different angles. Accordingly, a visual field for observation of an object to be operated may be expanded.

Document US 2012/044486 A1 discloses a system and a method for detecting defects on a waver.

Document WO 2008/028045 A2 discloses a system and method for robust finger-print acquisition comprising combined multispectral and total-internal-reflectance biometric imaging systems. A platen has multiple facets, at least one of which has a surface adapted for placement of a purported skin site by an individual and another facet may include an optical absorber. An illumination source and an optical arrangement are disposed to illuminate the purported skin site with light from the illumination source along distinct illumination paths, including paths at angles less than the critical angle and paths at angles greater than the critical angle. Both multispectral and total-internal-reflectance illumination are received by an imaging system. The imaging system may include first and second imaging locations adapted to record images from separate illumination paths. The platen may also include non parallel exits facets

SUMMARY OF THE INVENTION

An optical arrangement for imaging a sample is disclosed. The optical arrangement comprises at least one first objective lens and at least one second objective lens, at least one illumination source for producing an illumination beam, a detector for imaging radiation from the sample, and at least one mirror. The at least one mirror is adapted to reflecting the radiation from one of the first objective lens or the second objective lens into the detector. The position of the mirror is dependent on the illumination beam at the other one of the first objective lens and the second objective lens wherein the mirror can be double-sided. The use of the double-sided mirror enables a single detector to be used to image the sample from multiple sides and thus save on the detectors.

In one aspect of the disclosure the at least one mirror is translatable or rotatable.

In another aspect of the disclosure at least two mirrors are present and the reflected radiation can be directed into one of the at least two mirrors.

An optical filter can be inserted in the path of the illumination beam or the path of the radiation to select only certain wavelengths of light.

In a further aspect of the invention, a third objective lens can be used to collect the radiation from the sample.

A method for imaging a sample is also disclosed. The method comprises illuminating the sample using a first illumination beam, detecting, at a stationary detector in a stationary position, first radiation from the sample, processing the first radiation to obtain a first data set, illuminating the sample using a second illumination beam at an angle to the first illumination beam, detecting, at the stationary detector in the stationary position, second radiation from the sample, processing the second radiation to obtain a second data set, and combining the first data set and the second data set to produce an image of the sample.

DESCRIPTION OF THE DRAWINGS

FIG. 5a shows a third aspect using more than two objective lenses.

FIG. 5b shows another position of the third aspect of the optical arrangement

FIG. 5c shows another position of the third aspect of the optical arrangement

DETAILED DESCRIPTION OF THE INVENTION

The invention will now be described on the basis of the drawings.

It will be understood that the embodiments and aspects of the invention described herein are only examples and do not limit the protective scope of the claims in any way. The invention is defined by the claims and their equivalents. It will be understood that features of one aspect or embodiment of the invention can be combined with the feature of a different aspect or aspects and/or embodiments of the invention.

Figure 1:
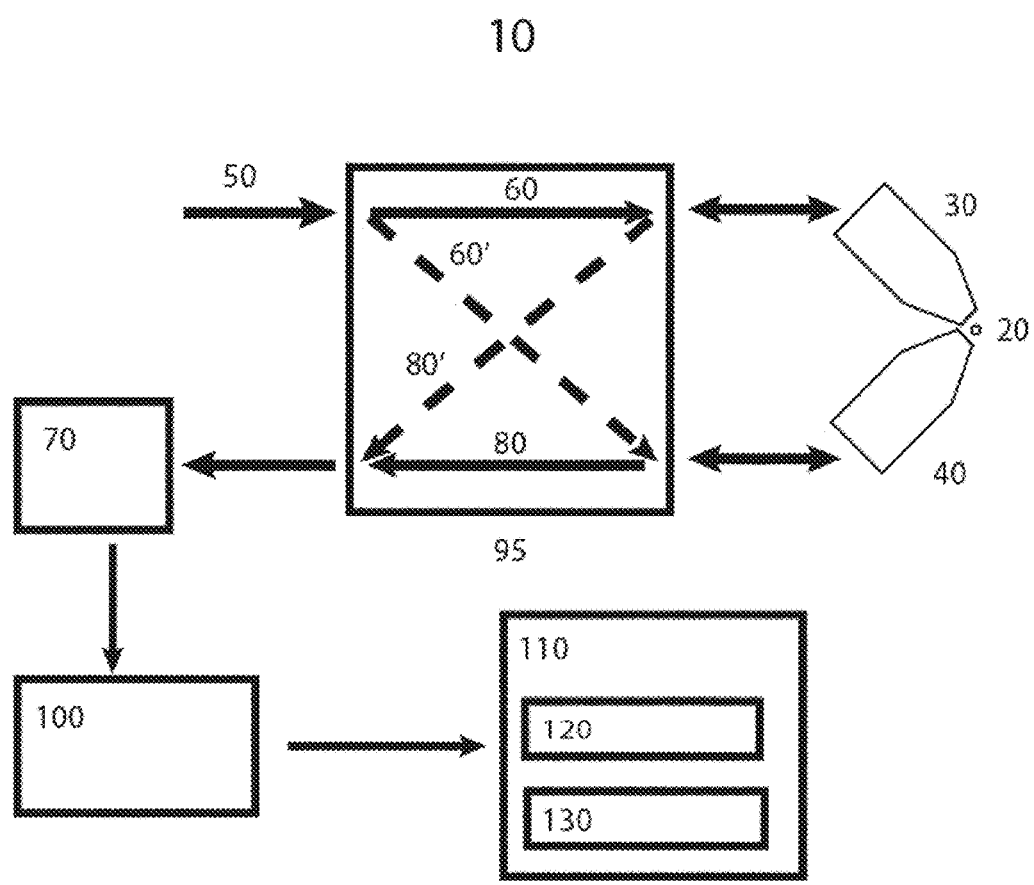
FIG. 1 shows a schematic view of an optical arrangement according to this disclosure.

FIG. 1 shows an overview of an optical arrangement 10 of this disclosure. The optical arrangement 10 has a first objective lens 30 and a second objective lens 40. Both the first objective lens 30 and the second objective lens 40 are able to image a sample 20 and/or direct an illumination beam 60 and 60' onto the sample 20. The optical arrangement 10 shown in FIG. 1 has two objective lenses 30 and 40, but this is not limiting of the invention. It would be possible to have an optical arrangement with a larger number of objective lenses.

The optical arrangement 10 has an illumination source 50 that produces the illumination beam 60. The optical arrangement 10 has also a detector 70 that is able to detect radiation 80 reflected or fluoresced from the sample 20.

The sample 20 is typically a biological sample. The sample 20 is to be imaged in three dimensions. It is known that a minimum of one view is required to create a 3D stack of images. At least two views are required in order to make a multi-view image of the sample 20 in the optical arrangement of FIG. 1a. The views can then be stored in a memory 110 as a first data set 120 and a second data set 130 and combined in a processor 100 in order to construct a multi-dimensional dataset. This multidimensional dataset can, for example, be used to create a 3D multi-view image of the sample 20.

Both of the first objective lens 30 and the second objective lens 40 can be used to illuminate the sample 20 and/or gather radiation fluoresced or reflected from the sample 20. This will be described using a black box 95 as is illustrated in FIG. 1. The black box 95 outlines the manner in which the illumination beam 60 from the illumination beam source 50 can be directed either to the first objective lens 30 or, for example by use of mirrors, as an illumination beam 60' to the second objective lens 40. The black box 95 also shows that radiation from the sample 20 can be directed either through the first objective lens 30 as a radiation beam 80' or from the second objective lens 40 and thence to the detector 70 as a radiation beam 80. The optical arrangement 10 illustrated in FIG. 1 is therefore able to create at least two images of the sample 20 from different angles in order to allow the construction of a 3D image of the sample 20. This principle can be implemented using different mirror arrangements as described below.

Figure 2A:
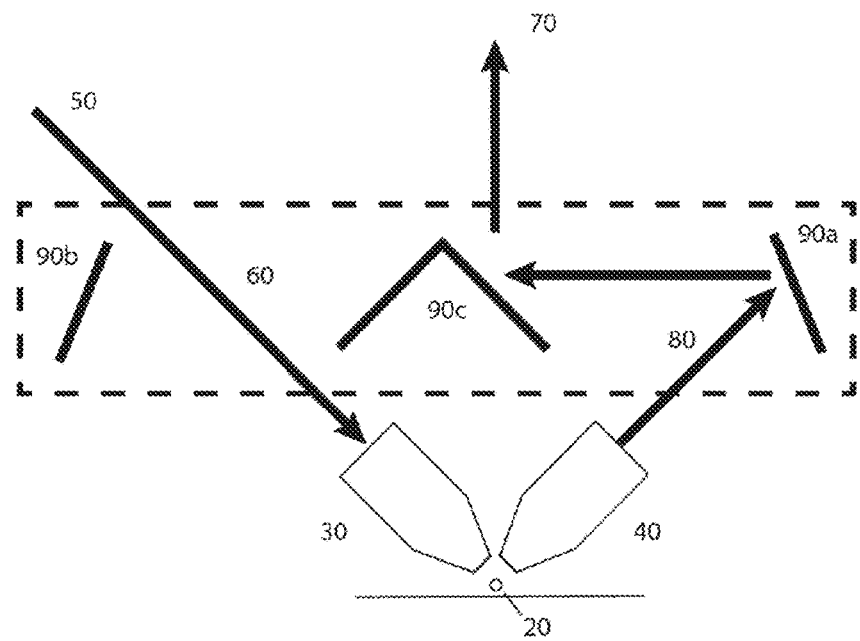
FIG. 2a shows a first aspect of the optical arrangement.
Figure 2B:
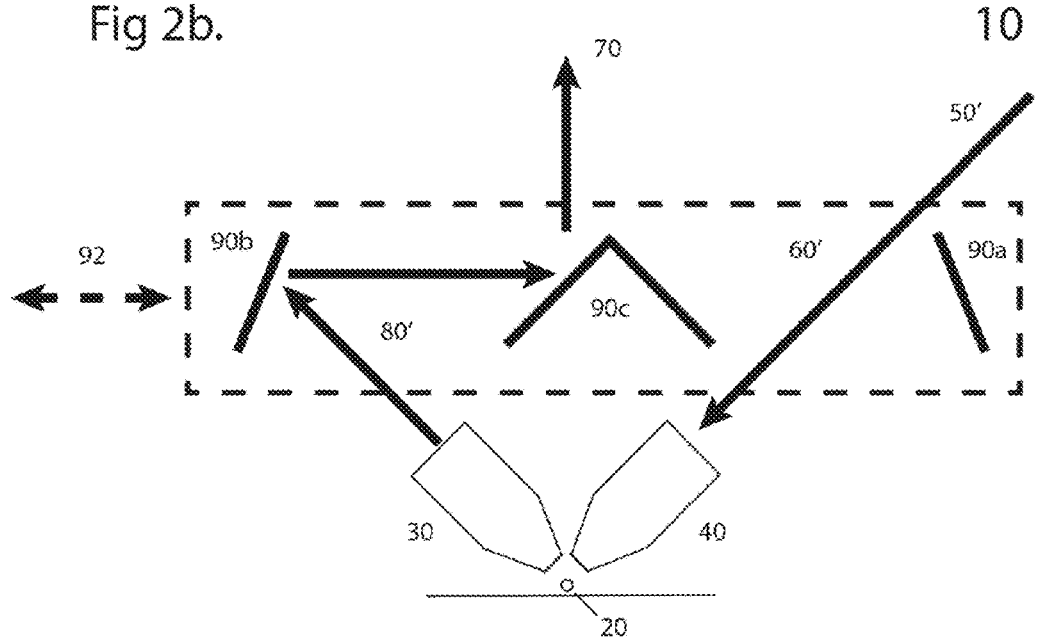
FIG. 2b shows another position of the first aspect of the optical arrangement.

FIGS. 2a and 2b show a first aspect of the optical arrangement 10 in which the illumination source 50 is located to one side of the detector 70. In FIG. 2a, the illumination source 50 is shown to the left hand side of the single detector 70 and produces an illumination beam 60 arriving at the first objective lens 30 from which the illumination beam 60 is projected onto the sample 20. Radiation from the sample 20 is imaged through the second objective lens 40 and strikes the right mirror 90a on the right hand side from which the radiation 80 is reflected to a central mirror 90c and thence into the detector 70. FIG. 2a includes further a left mirror 90b. It will be seen from FIG. 2a that the left hand mirror 90b does not interrupt the passage of the illumination beam 60 from the illumination source 50 on the left hand side.

The optical arrangement 10 of FIG. 2a can be compared with the optical arrangement 10 shown in FIG. 2b. The optical arrangement 10 of FIG. 2b comprises the same elements with the same numbers as shown in FIG. 2a. FIG. 2b shows, however, a further illumination source 50' on the right hand side which produces an illumination beam 60' entering the second objective lens 40. It will be seen that the right hand mirror 90a has been moved out of the path of the illumination beam 60', so that this right hand mirror 90a does not interrupt the passage of the illumination beam 60'. The radiation 80' from the sample 20 passes through the first objective lens 30 and is reflected by the left-hand side mirror 90b onto the central mirror 90c and thence into the detector 70. It will be noted that the right hand mirror 90a, the left hand mirror 90b and the central mirror 90c have in FIG. 2b been shifted to the right compared to the equivalent positions in FIG. 2a in order to allow the illumination beams 60, 60' and the radiation 80 and 80' to be reflected differently. This is indicated figuratively by arrow 92. It will be understood that the movement of the mirrors 90a, 90b, 90c, as indicated by the arrow 92, and can be easily implemented, for example on a sliding track.

Figure 3A:
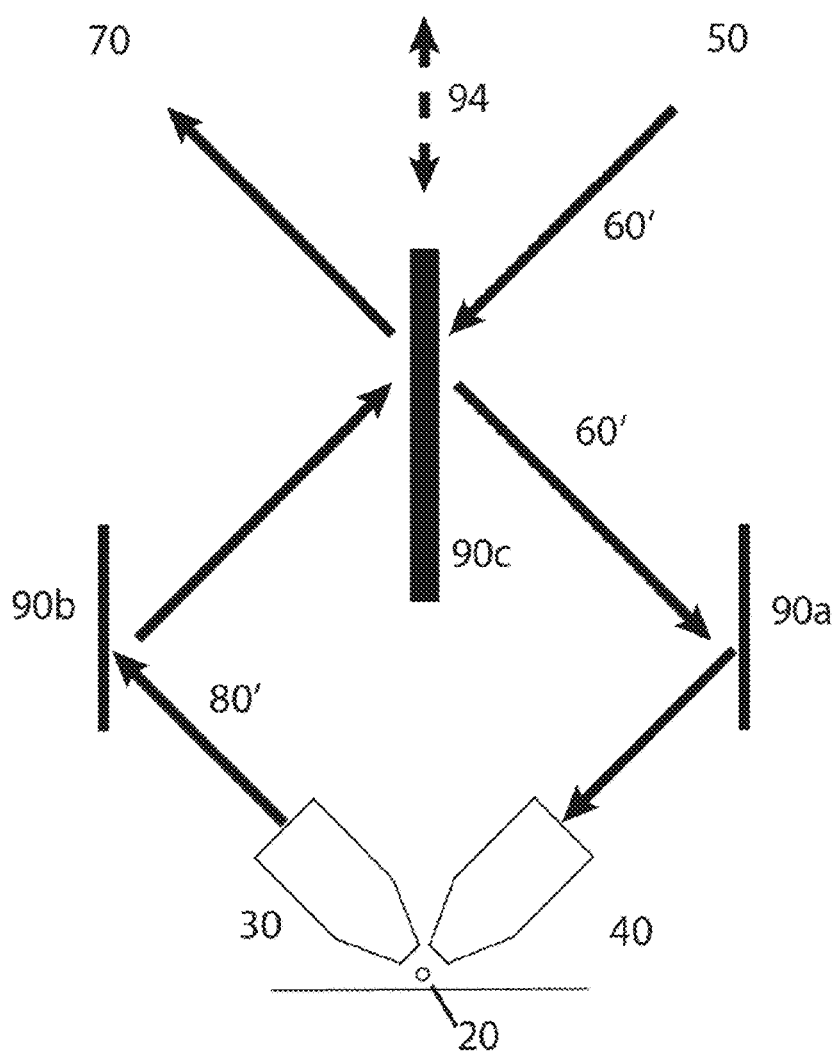
FIG. 3a shows a second aspect of the optical arrangement.
Figure 3B:
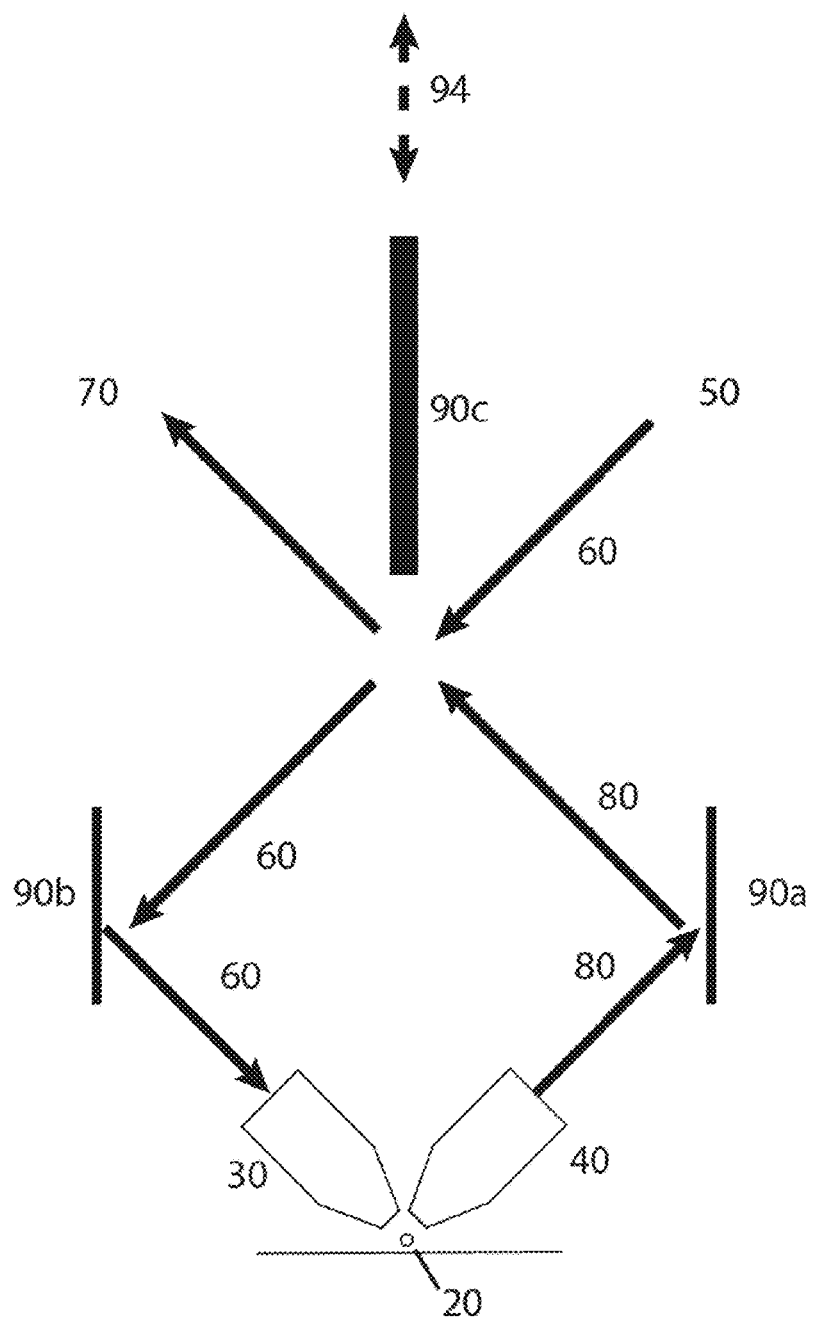
FIG. 3b shows another position of the second aspect of the optical arrangement.

FIGS. 3a and 3b show a second aspect of the invention in which a single central mirror 90c is moved up and down, as indicated by an arrow 94. The optical arrangement 10 of FIGS. 3a and 3b has otherwise the same elements as the optical arrangement shown on FIGS. 2a and 2b. The optical arrangement 10 has, however, a single detector 70 on the left hand side and a single illumination source 50 on the right hand side.

FIG. 3a shows a lower position of the central mirror 90c in which the illumination source 50 produces the illumination beam 60' reflected by the central mirror 90c onto the right hand mirror 90a and thence into the second objective lens 40, thereby illuminating the sample 20. Radiation from the sample 20 is collected by the first objective lens 30 and reflected by the left hand mirror 90b onto the central mirror 90c and thence into the detector 70.

In the aspect shown in FIG. 3b the central mirror 90c is moved to make way for the illumination beam 60 and the radiation 80. In this example the illumination beam 60 is produced by the illumination source 50 and is reflected by the left hand mirror 90b onto the sample 20 through the first objective lens 30. The radiation from the sample 20 is imaged through the second objective lens 40 and is reflected by the right hand mirror 90a into the detector 70. Using the aspect of the invention shown in FIGS. 3a and 3b two images of the sample 20 can be produced.

Figure 4:
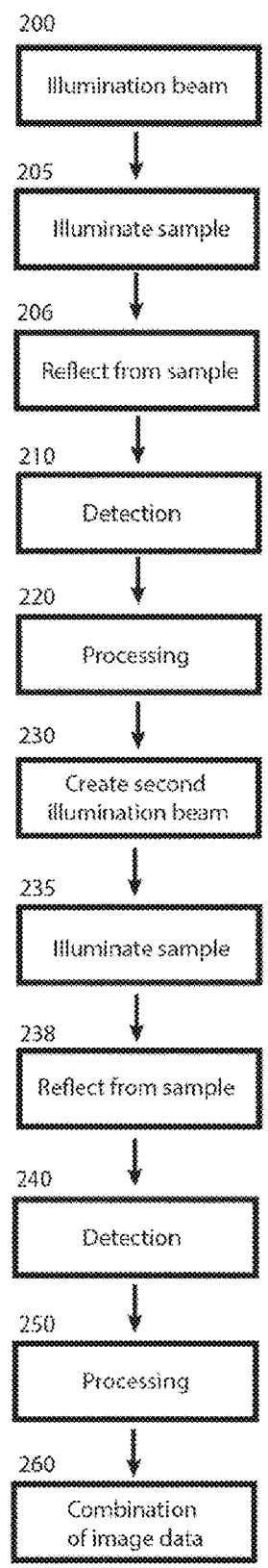
FIG. 4 shows a method imaging a sample according to this disclosure.

The method of the invention is shown in FIG. 4 in which an illumination beam is produced in step 200 from the illumination source 50 or 50'. It will be understood from FIGS. 2a and 2b as well as FIGS. 3a and 3b and FIGS. 5a-c that there may be a single one of the illumination source 50 (as shown in FIGS. 3a and 3b and FIG. 5a-c) or two illumination sources 50 and 50' as shown in FIGS. 2a and 2b. There may be more illumination sources, as is the case of having more than two objectives as depicted in FIGS. 5a-c. The illumination beam 50 is directed in step 205 to the sample 20 and reflected in step 206 from the sample 20. The detection of the radiation 80 is carried out in step 210 in the detector 70. The detector 70 can be, for example, a charge coupled device or any other detection instrument.

A first image produced from the illumination beam is processed in step 220 in a processor 100 and stored in a memory 110 as a first data set 120.

A second illumination beam coming from an illumination source 50 is created in step 230 and illuminates the sample 20 from a different direction in step 235. The second illumination beam is reflected from the sample 220 in step 238 and is detected in the same detector 70. The image is then processed in the processor in step 250 and stored in the memory 110 as a second data set 130. The first data set 120 and the second data set 130 forming the two images can be combined in step 260 in the processor 100 to produce the multi-view 3D image of the sample 20.

FIGS. 5a-c shows a third aspect of this disclosure using more than two objective lenses. The illumination beam 60, 60' or 60" is produced from the illumination source 50 and passes through one of a plurality of optical selectors 91a, 91b or 91c. The optical selectors 91a, 91b or 91c may be optical filters allowing passage of certain wavelengths, movable mirrors, moving shutters, or another possible optical selector device. FIGS. 5a-c illustrates particular cases in which an optical filter that allows certain wavelengths to pass through is utilized for the optical selectors 91a, 91b, or 91c. The illumination beam 60" of the aspect depicted in FIG. 5a passes through the optical filter 91c. The illumination beam 60" passes through a third objective lens 31 and illuminates the sample 20. The radiation 80 coming from sample 20 is collected by the second objective lens 40, reflects on the optical selector 91b, and reflects on the mirror 90b towards a radiation selector 96. The radiation selector 96 is shown as a rotating mirror in FIGS. 5a-c. The radiation selector 96 can be another type of movable radiation redirecting devices. The redirected radiation 80, 80' or 80" is directed onto the detector 70.

In this aspect of the invention each one of the first, third or second objective lenses 30, 31 and 40 can be used for illumination or detection. It is therefore also possible to collect the radiation 80' from sample 20 with the first objective lens 30, reflecting the radiation 80' on the optical selector 91a and on the mirror 90a, and subsequently causing the radiation selector 96 to redirect the radiation 80' to the detector 70, as demonstrated in FIG. 5c.

It is also possible to illuminate the sample 20 by sending an illumination beam 60 and/or 60' either through the optical selector 91a and/or the optical selector 91b, through the first objective lens 30 and/or the second objective lens 40, and collecting the radiation 80" from the third objective lens 31, reflecting the collected radiation 80" with the optical selector 91c and further with mirror 90c onto the radiation selector 96, thus redirecting radiation 80" to detector 70, as demonstrated in FIG. 5b.

REFERENCE NUMERALS

10 Optical arrangement
20 Sample
30 First objective lens
31 Third objective lens
40 Second objective lens
50, 50' Illumination source
60, 60', 60" Illumination beam 70 Detector
80, 80', 80" Radiation
90a,b,c Mirror
91a,b,c Optical Selector
92 Arrow
94 Arrow
95 Black box
96 Radiation selector
100 Processor
110 Memory
120 First data set
130 Second data set

The invention claimed is:

1. An optical arrangement for imaging a sample comprising:
    at least one first objective lens and at least one second objective lens;
    at least one illumination source for producing an illumination beam;
    a detector for imaging radiation from the sample; and
    at least one movable mirror being movable between at least a first position and a second position;
    wherein the at least one movable mirror reflects in the first position one of the illumination beam and the radiation, or both of the illumination beam and the radiation; and
    the at least one movable mirror reflects in the second position the other of the illumination beam and the radiation, or neither of the illumination beam and the radiation;
    wherein, depending on the at least one movable mirror being in the first position or the second position, the illumination beam is directed through one of the first objective lens and the second objective lens, and the radiation is directed through the other of the first objective lens and the second objective lens.

2. The optical arrangement of claim 1, wherein the at least one movable mirror is translatable or rotatable.

3. The optical arrangement of claim 1, wherein the at least one movable mirror is double-sided.

4. The optical arrangement of claim 1, further comprising at least two further movable mirrors and wherein the reflected radiation can be directed into one of the at least two further movable mirrors.

5. The optical arrangement of claim 1, further comprising an image processor connected to the detector.

6. The optical arrangement of claim 1, wherein the sample is a fluorescing sample and the radiation is fluorescing radiation.

7. The optical arrangement of claim 1, further comprising at least one optical filter.

8. The optical arrangement of claim 1, further comprising at least a third objective lens for illuminating the sample or collecting radiation from the sample.

9. A method for imaging a sample comprising:
    positioning at least one movable mirror to a first position, in which first position the at least one movable mirror reflects one of an illumination beam and radiation from a sample, or both of the illumination beam and the radiation;
    illuminating the sample using the illumination beam;
    detecting, at a stationary detector in a stationary position, the radiation from the sample;
    processing the radiation to obtain a first data set;
    repositioning the at least one movable mirror to a second position, in which second position the at least one movable mirror reflects the other of the illumination beam and the radiation, or neither of the illumination beam and the radiation;
    illuminating the sample using the illumination beam;
    detecting, at the stationary detector in the stationary position, the radiation from the sample;
    processing the radiation to obtain a second data set; and
    combining the first data set and the second data set to produce an image of the sample,
    wherein, depending on the at least one movable mirror being in the first position or the second position, the illumination beam is directed through one of the first objective lens and the second objective lens, and the radiation is directed through the other of the first objective lens and the second objective lens.

10. The method of claim 9, further comprising:
    illuminating the sample with at least one third illumination beam, and
    detecting, at the stationary detector in a stationary position, third radiation from the sample.

11. The method of claim 10, wherein the third radiation from the sample is directed through one of the first objective lens or the second objective lens.

12. The method of claim 9, wherein at least two of the first illumination beam, the second illumination beam, and the third illumination beam are produced from a single illumination source, the method further comprising moving the at least one movable mirror to one of the first position, the second position, and a third position, to reflect one of the first illumination beam, the second illumination beam, or the third illumination beam.

13. The method of claim 9, further comprising an optically filtering of at least one of the first illumination beam, the second illumination beam, or the third illumination beam.

* * * * *

UNITED STATES PATENT AND TRADEMARK OFFICE
CERTIFICATE OF CORRECTION

PATENT NO. : 10,459,210 B2
APPLICATION NO. : 15/302569
DATED : October 29, 2019
INVENTOR(S) : Gustavo Quintas Glasner Page 1 of 1

It is certified that error appears in the above-identified patent and that said Letters Patent is hereby corrected as shown below:

On the Title Page

Under the heading (30) Foreign Application Priority Data:
(EP) ........ "14163919" should be -- 14163919.5 --.

In the Specification

Column 2, Line 20:
"tow" should be -- toto --.

Column 2, Line 23:
"tow" should be -- toto --.

Signed and Sealed this
Tenth Day of December, 2019

Andrei Iancu
*Director of the United States Patent and Trademark Office*